H. Willard,
Making Staves.

No. 103,001. Patented May 10, 1870.

Witnesses
Henry G. Aret
Fredk Maynsford

Inventor.
Henderson Willard

United States Patent Office.

HENDERSON WILLARD, OF GRAND RAPIDS, MICHIGAN.

Letters Patent No. 103,001, dated May 10, 1870.

IMPROVEMENT IN METHOD OF FORMING CYLINDERS.

The Schedule referred to in these Letters Patent and making part of the same.

To all whom it may concern:

Be it known that I, HENDERSON WILLARD, of Grand Rapids, in the county of Kent and State of Michigan, have invented a new and useful Method of Forming Cylindrical Packages; and I do hereby declare the following to be a full and sufficient description of the same, reference being had to the accompanying drawings which make part of this specification, and in which—

Like letters of reference indicate like parts in the several figures.

The nature of my invention consists in forming cylinders for constructing packages from a solid piece of timber, the grain of which runs parallel to its length, by cuts with a gang of gig-saws, the cuts being made at right angles to the plane of a cross-section of the piece of timber, so as to produce cylinders in which the grain of the wood runs parallel to the sides of the packages from top to bottom.

Figure 1:
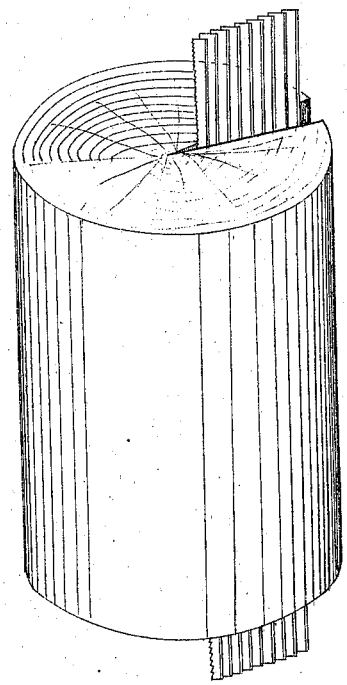
Figure 1 is a perspective view of the method of carrying out the invention.
Figure 2:
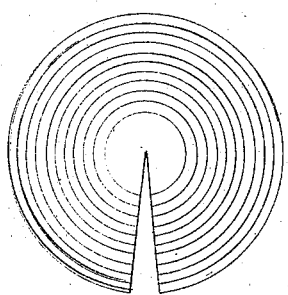
Figure 2 is a cross-section showing the cut used in this method.

In fig. 1 a gang of band or gig-saws is made to cut, from a radial slot, concentric cylinders, thus cutting one piece of timber into the required number of cylinders at one operation, the cuts being shown in fig. 2.

I am aware that cylindrical packages have been produced by such cuts as I have described, as, for instance, as shown in the patent of Leonard Asa Fleming, dated January 4, 1870, but in those cases the fibers of the wood, as it is presented to the saw or saws, is inclined at an angle toward the line of the saws, and the latter consequently cuts through the fiber diagonally, thus producing a package with flaring sides, in which the grain is vertical or at right angles to the plane of a cross-section of the package, but not parallel to the sides of the same, so that the cut and torn fibers of the wood, as produced by the saw-cut, terminate all over, and, in fact, form the entire surface of the sides of the package. Such a vessel, when splitting, will not split from top to bottom, but diagonally to the thickness of the sides, separating an upper portion of the side from the lower portion.

Figure 3:
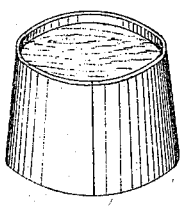
Figure 3 is a perspective view of a conically-shaped package produced by my improved method.

In fig. 3 I show a cylindrical package with flaring sides, produced by the cuts described, but having the grain running parallel with the length of the sides, from top to bottom, but not at right angles to the plane of a cross-section of the package. This is produced by first cutting a cylinder, as shown in figs. 1 and 2, then exsecting a wedge-shaped piece from the sides and bringing the cut edges together. Hoops, or other modes of securing, may be applied and the top and bottom edges trimmed off even.

I do not, of course, claim broadly cutting cylinders from solid pieces of timber, as I am well aware that this has long been done; nor do I claim producing cylindrical packages by the method of Mr. Fleming, which I have mentioned above; but

What I claim as my invention, and desire to secure by Letters Patent, is—

The hollow cylinder herein shown and described, when produced in the manner and for the purpose specified.

In witness that I claim the above, I have hereunto set my hand this 12th day of February, A. D. 1870.

HENDERSON WILLARD. [L. S.]

Witnesses:
EDWARD TAGGART,
CHAS. O. SIMONDS.